United States Patent [19]

Edwards

[11] Patent Number: 4,971,052
[45] Date of Patent: Nov. 20, 1990

[54] BREATHING APPARATUS

[75] Inventor: David B. Edwards, Harrow, England

[73] Assignee: Racal Safety Limited, Wembley, England

[21] Appl. No.: 380,825

[22] Filed: Jul. 17, 1989

[30] Foreign Application Priority Data

Jul. 26, 1988 [GB] United Kingdom ................ 8817724
May 19, 1989 [GB] United Kingdom ................ 8911527

[51] Int. Cl.⁵ .............................................. A62B 7/10
[52] U.S. Cl. .................................. 128/205.12; 417/45
[58] Field of Search ....................... 128/204.29, 205.12,
128/206.12, 206.15, 205.29, 206.17, 204.21,
204.28; 417/45

[56] References Cited

U.S. PATENT DOCUMENTS

| 3,580,082 | 5/1971 | Strack . | |
|---|---|---|---|
| 3,590,640 | 7/1971 | Cindrich . | |
| 4,322,978 | 4/1982 | Fromm . | |
| 4,322,979 | 4/1982 | Fromm . | |
| 4,430,995 | 2/1984 | Hilton | 128/205.12 |
| 4,464,936 | 8/1984 | McIntire et al. . | |
| 4,478,216 | 10/1984 | Dukowski | 128/205.12 |
| 4,502,480 | 3/1985 | Yamamoto | 128/205.12 |
| 4,646,732 | 3/1987 | Chien | 128/205.12 |
| 4,741,332 | 5/1988 | Beaussant | 128/205.12 |

FOREIGN PATENT DOCUMENTS

| 0196784 | 10/1986 | European Pat. Off. . | |
|---|---|---|---|
| 2450080 | 4/1976 | Fed. Rep. of Germany . | |
| 5321972 | 12/1976 | Japan . | |
| 53-77571 | 10/1978 | Japan . | |
| 56-129830 | 10/1981 | Japan . | |
| 57-30921 | 2/1982 | Japan . | |
| 57-131032 | 8/1982 | Japan . | |
| WO86/06643 | 11/1986 | PCT Int'l Appl. | 128/205.12 |
| 1501857 | 4/1975 | United Kingdom . | |
| 1495020 | 12/1977 | United Kingdom . | |
| 2032284 | 5/1980 | United Kingdom . | |
| 2043239 | 10/1980 | United Kingdom . | |
| 2086572 | 5/1982 | United Kingdom . | |
| 2115548 | 9/1983 | United Kingdom . | |
| 2141348 | 12/1984 | United Kingdom . | |
| 2130893 | 10/1985 | United Kingdom . | |

Primary Examiner—Eugene H. Eickholt
Attorney, Agent, or Firm—Jerry A. Miller

[57] ABSTRACT

A powered respirator comprises a motor-driven fan unit drawing air through an upstream filter for delivery to a facepiece. Operation of the fan motor is controlled in response to a differential pressure sensor tapped in across the fan unit so as to reduce the fan throughput in response to an increase in the pressure differential and to increase the fan throughput in response to a decrease in the pressure differential, and thereby match the delivery of air to the breathing demand of the wearer. The diaphragm or other pressure-responsive member of the sensor is isolated from unfiltered air and can therefore provide no leakage path for contaminants to the facepiece. In an alternative embodiment the positions of the fan and filter are reversed so that the fan is upstream of the filter, and similarly controlled in response to the differential pressure across the fan. In the latter arrangement any contaminant which could pass through the pressure sensor is removed by the downstream filter before delivery to the facepiece.

13 Claims, 3 Drawing Sheets

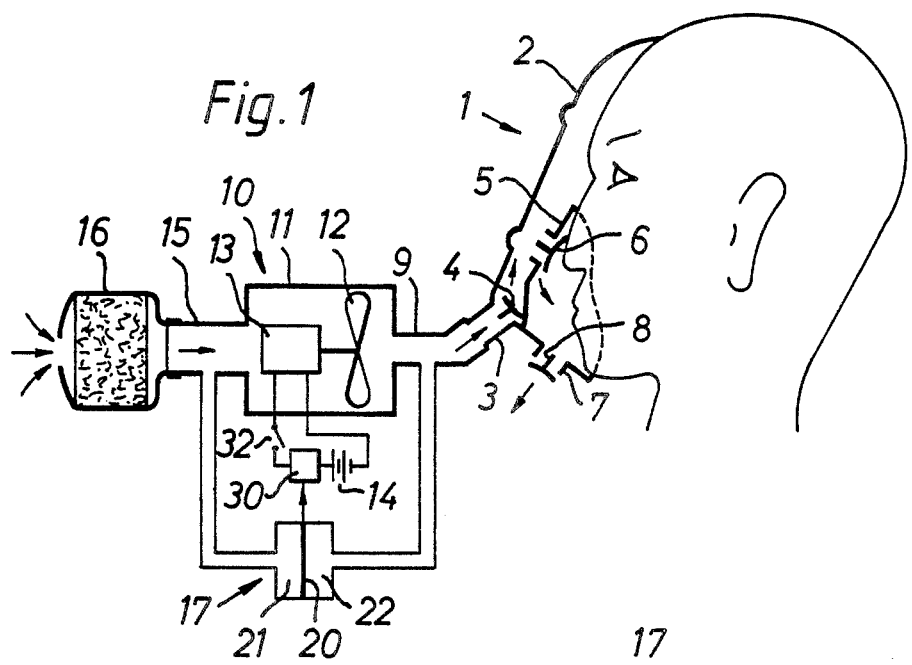
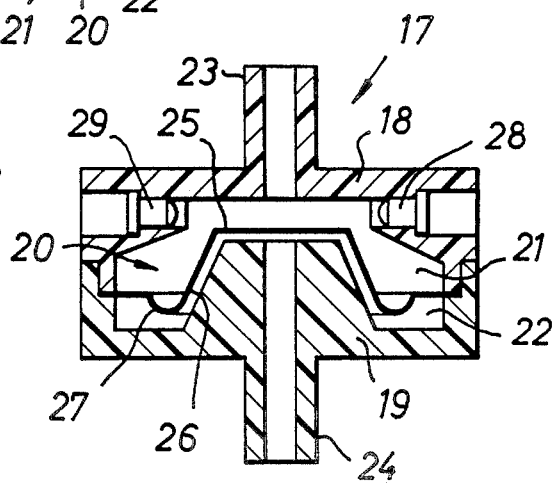

BREATHING APPARATUS

BACKGROUND

The present invention relates to breathing apparatus of the kind known as powered respirators or power-assisted respirators, in which a motor-driven fan provides a forced flow of filtered air to the face of the wearer to ensure (in normal operation) that he has an adequate supply of clean breathable air when worn in a contaminated environment.

A major benefit to the wearer of a powered respirator, in comparison to a conventional non-powered respirator in which the filter(s) are attached directly to the inlet of the facepiece, is that his lungs are relieved of the strain otherwise caused by inhalation against the resistance of the filter(s). This is particularly so in the case of activated charcoal and the like chemical filters adapted for the removal of contaminant gases and/or vapours from the air, which generally have breathing resistances far in excess of those of dust and other particulate filters.

Most powered respirators are arranged to provide a constant and continuous flow of air to the user irrespective of his actual breathing demand at any particular time. This is, however, quite wasteful and leads to premature exhaustion of the filter(s)—and possibly also of the batteries from which the fan is powered—as it is only during the inhalation phase that the filtered air is actually required. This problem of limited filter life is again particularly acute in the case of gas and vapour filters although it is also true of particle-removing filters.

In order to reduce this problem and effectively increase the useful life of the filter(s) in a powered respirator it has been proposed to control the operation of the fan motor in accordance with a sensed pressure parameter at some point within the apparatus, so that the motor is switched off during exhalation of the user. Air is therefore not drawn through the filter(s) during these periods and the capacity of the filter(s) (and of the batteries for the motor) is not unnecessarily depleted. For example, in United Kingdom patent specification no. 2032284 a sensor monitors the pressure in the facepiece of the respirator and switches off the motor when this rises above a certain threshold as a result of the user's exhalation. In United Kingdom patent specification no. 2141348 a sensor monitors the pressure at a point between the filter(s) and fan (the former being upstream of the latter) and switches off the motor when this also rises above a certain threshold as a result of the user's exhalation (and consequent closure of an inhalation valve at the facepiece).

In these prior systems the pressure in response to which the motor is controlled is sensed as a differential with respect to atmospheric pressure. The pressure sensors accordingly comprise a thin flexible diaphragm communicating on its opposite sides respectively with the interior of the respirator at the chosen point and with the external atmosphere—that is to say the contaminated atmosphere from which respiratory protection is required. It has been found, however, that certain chemical contaminants against which protection may be required can attack or otherwise readily diffuse through the materials from which such pressure sensor diaphragms are conventionally made, with potentially hazardous results for the user. It can also be mentioned that these prior art control systems are essentially full on/full off or two-state systems and hence cannot properly match the delivery of filtered air to the changing breathing demands of the user.

SUMMARY OF THE INVENTION

The present invention seeks to overcome these drawbacks of the prior art and accordingly in one aspect resides in a breathing apparatus comprising a motor-driven fan; filter means connected to the fan for removing one or more unwanted components from air drawn into the apparatus from the external atmosphere by operation of the fan; a facepiece or other breathing interface means connected to receive such filtered air; a differential pressure sensor comprising a diaphragm or other flexible pressure-responsive member (e.g. bellows) so connected to the apparatus as to be exposed on its opposite sides respectively to the pressure within the apparatus downstream of at least a stage of said fan and the pressure within the apparatus upstream of at least said stage of said fan or atmospheric pressure, and whereby in the event of destruction of or permeability of said pressure-responsive member to a said unwanted component the connection of the pressure sensor provides no pathway from the external atmosphere to said breathing interface means which does not also include said filter means; and means for controlling the operation of the fan motor in response to said sensor whereby to reduce the throughput of the fan in response to an increase in the pressure differential sensed by the sensor and to increase the throughput of the fan in response to a decrease in said pressure differential.

Two particular arrangements are envisaged. In the first, the filter means are connected upstream of the fan and the pressure-responsive member is connected so as to be exposed on its opposite sides respectively to the pressure within the apparatus downstream of at least said stage of the fan and the pressure within the apparatus downstream of the filter means but upstream of at least said stage of the fan. Accordingly, both sides of the pressure-responsive member in the pressure sensor are exposed to air which has already traversed the filter and neither side is exposed to the external, contaminated atmosphere. The problem of potential attack or diffusion through that member by contaminants in the atmosphere is therefore overcome.

In some circumstances, however, it is preferred to arrange a power-assisted respirator such that the filter is connected directly to the inlet of the facepiece or other breathing interface means and the fan is connected upstream of the filter, i.e. so that it operates in a "pusher" mode in relation to the filter as opposed to the "puller" mode described above. For example, some users prefer this arrangement in order to minimize the number of sealed connections required between the filter and facepiece, or so that a facepiece can be prepared with a filter attached and a fan unit connected up subsequently.

In the second preferred arrangement of the invention, therefore, the filter means are connected downstream of the fan and the pressure-responsive member is connected so as to be exposed on its opposite sides respectively to the pressure within the apparatus downstream of at least said stage of the fan but upstream of the filter means and the pressure within the apparatus upstream of at least said stage of the fan or atmospheric pressure. In this way, although the diaphragm or other pressure-responsive member of the pressure sensor may be exposed to contaminated air, because the sensor is connected upstream of the filter means any contaminant which may diffuse through that member will be removed from the air flow prior to delivery to the user. In the extreme, albeit unlikely, event of destruction of the pressure-responsive member by a particularly aggressive atmosphere, the sensor can be arranged to "fail safe" in the sense that it will then permit continuous operation of the fan motor.

In either arrangement, the sensed pressure differential will normally be that existing between the outlet and the inlet of the fan, as being the maximum sensible differential in the fan system, (or between the outlet of the fan and atmosphere in the second arrangement). However, in some embodiments where it is not necessary to work from the maximum differential other points within the fan may be selected.

In a preferred embodiment, the pressure sensor is arranged to provide a variable output over a range of pressure differentials in response to which proportional control of the fan throughput is effected. In this case the sensor may comprise an emitter and a receiver of infra red light or other selected electromagnetic radiation mounted in relation to the pressure-responsive member such that the level of radiation received from the emitter by the receiver is dependent upon the flexural position adopted by that member, whereby the output of the receiver signals variations in the pressure differential.

The sensed pressure differential will itself be dependent upon the breathing pattern of the user and the way in which this can be used to vary the operation of the fan in accordance with the user's breathing demand will be more easily understood from the ensuing particular description of preferred embodiments of the invention, taken in conjunction with the accompanying schematic drawings.

BRIEF DESCRIPTION OF THE DRAWINGS

FIG. 1 is a diagrammatic representation of a breathing apparatus in accordance with one embodiment of the invention;

FIG. 2 is a section through a preferred embodiment of a differential pressure sensor for use in the apparatus of FIG. 1;

DESCRIPTION OF THE INVENTION

Figure 3:
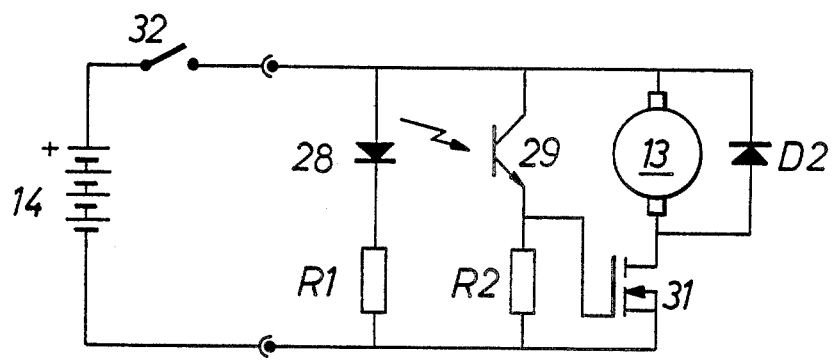
FIG. 3 is a diagram of the electronic control circuit for the fan motor of the apparatus.

Referring to FIG. 1, the schematically illustrated embodiment of a respirator according to the invention has a facepiece 1 comprising a full face mask covering the eyes, nose and mouth of the wearer, which is held in place by retaining means (not shown) extending around the back of the wearer's head and is peripherally sealed to the head of the wearer. This facepiece is of the double-mask kind having a visored outer mask 2 with an air inlet 3 provided with a one-way inlet valve 4, and an inner mask 5 covering just the nose and mouth which communicates with the space inside the outer mask through one or more one-way valves 6. The inner mask 5 has an outlet 7 to atmosphere provided with a one-way exhalation valve 8.

Connected to the facepiece inlet 3 is the outlet 9 of a fan unit 10. The unit 10 comprises a housing 11 within which is a centrifugal or (as represented) axial fan 12 driven by a d.c. electric motor 13 powered from batteries 14. This unit also has an inlet 15 to which is connected a replaceable filter canister 16 selected for the risk in which the respirator is intended for use at any particular time. In practice the inlet 15 may be bifurcated or otherwise multiplied for the connection of two or more canisters 16 in parallel.

In operation of the motor 13, therefore, the fan 12 is driven to draw in contaminated air from the external atmosphere through the filter canister(s) 16 where the contaminant is removed, and delivers the filtered air to the inlet 3 of the facepiece whence it passes into the inner mask 5 to meet the breathing needs of the wearer, and the exhalate and any excess delivered air exits through the valve 7. As thus far described the respirator is purely conventional. In addition, however, it is equipped with means for controlling the operation of the motor 13 so as to minimize unnecessary depletion of the filter(s) 16, as will now be described.

Tapped in across the fan unit 10 from its inlet 15 to its outlet 9 is a differential pressure sensor 17. In a preferred embodiment this sensor is as illustrated in FIG. 2 from which it is seen to comprise two moulded-plastics housing parts 18 and 19 mating around their marginal edges and clamping between them the periphery of a thin elastomeric diaphragm 20. The diaphragm thus separates two chambers 21 and 22 within the housing, each having an inlet 23, 24 for connection to the respective source of pressure; (although for convenience of illustration the sensor is shown as physically separate from the fan unit 10, in practice it is preferably integrated with the fan casing with inlets tapped directly into the required points). The diaphragm in this case is of "top hat" section having a central circular disc portion 25 which is joined to its peripheral portion through a frusto-conical portion 26 and an annular corrugation 27 which provides the operative flexibility of the diaphragm. In response to changing differential pressures between the chambers 21 and 22, therefore, the central portion 25 of the diaphragm moves up and down (in the sense as viewed in the FIGURE) by flexure of the corrugated portion 27, while remaining substantially perpendicular to its axis.

Mounted in the housing part 18 and facing each other across the chamber 21 are an infra-red light emitting diode (LED) 28 and a photo-transistor receiver 29. In operation, the LED 28 emits a relatively wide beam of infra-red radiation towards the photo-transistor 29, perpendicular to the direction of movement of the diaphragm 20, and the relative position of the latter is monitored by detection of the light energy received from the LED by the photo-transistor.

More particularly, the height of the central portion of the diaphragm 20 within the housing at any time depends upon the extent to which the pressure within the chamber 22 exceeds that within the chamber 21. As the diaphragm moves up and down it occludes to a greater or lesser extent the infra-red beam passing between the LED 28 and photo-transistor 29. The light energy received by the photo-transistor—and hence its electrical resistance— therefore varies in dependence upon the pressure differential between chambers 22 and 21 and this changing resistance can be detected by a suitable circuit within a motor-control unit (indicated schematically at 30 in FIG. 1) to control the operation of the fan motor 13. A suitable implementation of the control circuit is shown in FIG. 3, where the photo-transistor 29 effectively acts as a variable resistor forming a potential divider with a resistor R2 and thus increases and decreases the gate voltage applied to a MOSFET 31 as the light energy received by the photo-transistor 29 increases and decreases. The varying gate voltage on the MOSFET effectively varies the voltage applied across, and therefore the current flowing through, the motor 13. The illustrated resistor R1 is a current-limiting resistor for the LED 28 and the illustrated diode D2 forms a return path for the back-EMF generated by the motor 13 when the voltage across the motor is rapidly reduced, thus protecting the MOSFET 31 from possibly damaging reverse voltages.

The connection of the sensor 17 to the respirator system is such that its chamber 22 experiences the air pressure at the outlet 9 of the fan unit 10 and its chamber 21 experiences the air pressure at the inlet 15 of the fan unit. The diaphragm 20 in this arrangement is therefore isolated on both sides from the external contaminated atmosphere, in the sense that it is exposed only to air to which has already traversed the filter(s) 16. Even if it were to be permeable or for some reason otherwise fail to provide an effective seal between the two chambers 21 and 22, therefore, its connection would provide no pathway for unfiltered air to reach the facepiece 1.

The diaphragm 20 is mounted in the sensor such that in its unstressed condition, with equal pressures in the chambers 21 and 22, it is towards the lower end (in the sense as viewed in FIG. 2) of its range of travel, clear of the beam of light from the emitter 28 to the receiver 29. Consequently, when the motor 13 is first energized upon closure of the main on/off switch 32 it is initially supplied with full power from the batteries 14 corresponding to the condition of maximum light reception by the sensor receiver 29. The motor accordingly immediately accelerates the fan 12, generating a pressure differential between the inlet 15 and outlet 9 of the fan unit of a magnitude dependent upon the resistance of the filter canister(s) 16 at a flow rate dependent upon the resistance of the canister(s) and the mask valve system. This pressure differential is applied across the diaphragm 20 of the sensor 17 and the diaphragm accordingly flexes up to occlude the light beam passing between the emitter 28 and receiver 29 by an amount determined by the applied pressure differential. The reduction in light energy received by the receiver 29 causes the motor-control unit 30 to correspondingly reduce the current to the motor 13, thus slowing the fan 12 and reducing the sensed pressure differential. The diaphragm 20 is accordingly permitted to relax partially, thereby increasing the light reception at the receiver 29, increasing the speed of the fan 12 and therefore its pressure differential, and so on. In practice, and ignoring for the moment the effects of the wearer's breathing pattern, the diaphragm 20 very quickly attains an equilibrium position in which its degree of occlusion of the light beam in the sensor is in balance with the resultant fan pressure differential.

In other words, in the absence of an imposed breathing pattern the effect of this control system is to regulate the fan speed to provide a generally constant pressure differential across the fan unit and a correspondingly generally constant flow of filtered air through the system. In practice the operating parameters of the sensor and its related electronic control circuit are chosen so that this regulated flow is set at a modest level of, say, 20 liters/minute, which is just sufficient to meet the breathing demand of a typical user at rest, keeps his face cool and the visor demisted and assures the wearer that the system is operating, without, however, leading to substantial wastage of filtered air (in comparison with, for example, a typical conventional constant-flow powered respirator which delivers continuously at a rate to meet a peak breathing demand of, say, 160 liters/minute). This regulated minimum but positive operating level also has the advantage of avoiding the high current drain which would otherwise be involved in starting the motor from rest at the beginning of each inspiration, if the system was instead arranged actually to switch off when there is no inspiratory demand.

Dealing now with the normal operating conditions of the respirator, the inspiratory demand of the wearer will usually be substantially greater than the regulated minimum flow discussed above and, as is well known, its magnitude will at any particular time depend upon numerous factors such as lung capacity, fitness, work rate and so on. Normal inhalation, therefore, will cause a reduction of pressure at the mask inlet 3 and fan outlet 9, by an amount determined by the demand, with consequent decrease of the pressure differential across the fan unit. The sensor diaphragm 20 accordingly responds by reducing its occlusion of the light beam passing between emitter 28 and receiver 29 by an amount dependent upon the sensed fan differential, and in the limit may move completely clear of the beam. In any event, the consequent increase in light reception at the receiver 29 is accompanied by a corresponding increase in powert to the motor 13 and a corresponding increase in the throughput of the fan to meet the breathing demand. At the end of inspiration and during exhalation the differential pressure across the fan increases again and returns the sensor diaphragm 20 to (or possibly temporarily beyond) its regulated minimum flow condition discussed above.

In this way, the diaphragm 20 is continually adjusting its position throughout the operation of the system to control the throughput of the fan unit in accordance with the breathing demand as represented by the pressure differential across the fan, between the lower limit previously discussed and the maximum flow available with full power to the motor 13 (which may or may not be attained during any particular inspiration).

Two other interactions within the system are catered for by the described control means, namely increased resistance of the filter(s) 16 due to clogging by retained contaminants and falling supply voltage as the batteries 14 begin to exhaust.

As the filter(s) 16 begin to clog their resistance increases, and the airflow through the system for a given fan speed will accordingly reduce. At low flow rates, such as the 20 liters/minute minimum regulated flow which the control system is adapted to provide, the effect of the increased filter resistance is only slight and the corresponding equilibrium position of the sensor diaphragm 20 will alter only marginally from that which pertains with fresh filter(s). The effect of this increased resistance during inspiration, however, will be that the user creates still lower pressures at the fan outlet 9, to which the sensor 17 accordingly reacts to cause the control unit 30 to provide more current to the motor 13, and thereby compensate for the reduced flow rate, up to the maximum power available.

As the battery voltage begins to fall, so the current which is available to the motor 13 for a given position of the sensor diaphragm 20 also falls with a corresponding reduction in the pressure differential across the fan unit. The equilibrium position of the diaphragm is therefore automatically adjusted (downwards in the sense as viewed in FIG. 2) in accordance with the fan differential pressure to maintain the current to the motor at a level sufficient to achieve the regulated minimum flow condition, and represents the new threshold position of the diaphragm from which it will depart in response to the user's inspiration; Of course, if operation is continued with exhausting batteries a point is ultimately reached in which the diaphragm's equilibrium position shifts completely clear of the light beam in the sensor 17, meaning that there is no longer sufficient power left in the batteries 14 to maintain even the 20 liters/minute value of flow.

Figure 4:
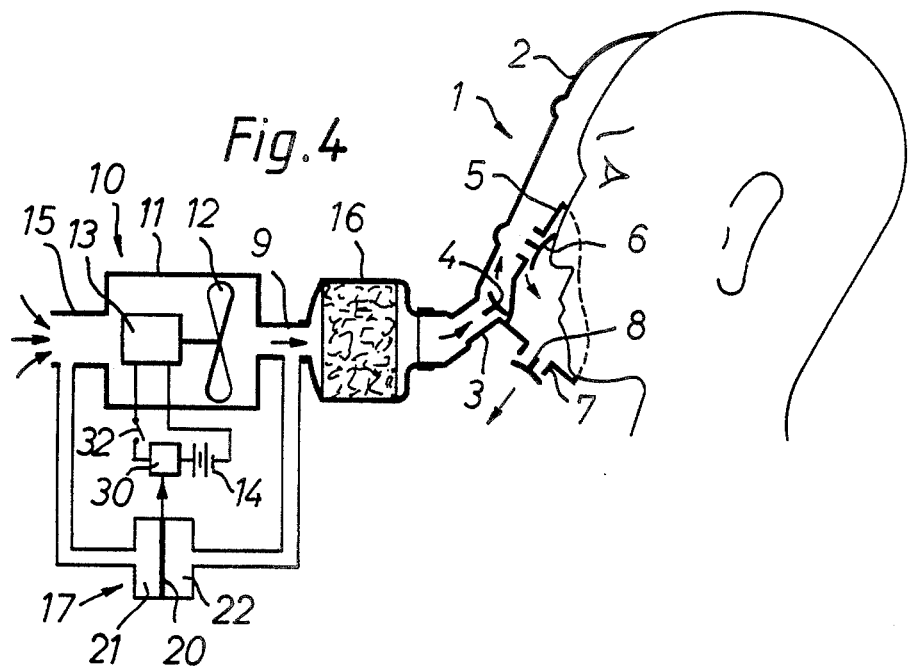
FIG. 4 is a diagrammatic representation of a breathing apparatus in accordance with a second embodiment of the invention.

Turning now to FIG. 4, this shows a respirator comprising the same facepiece 1, fan unit 10, filter 16 and differential pressure sensor 17 as described above with reference to FIG. 1, but in which the filter 16 is in this case connected directly to the facepiece inlet 3 and the fan unit 10 is connected upstream of the filter 16 whereby to impel air through the filter from the high pressure side of the fan rather than to draw air through the filter by its low pressure side. The pressure sensor 17 for controlling operation of the fan motor 13 is once again tapped in across the inlet 15 and outlet 9 of the fan unit. In this arrangement, the absolute pressures at the fan inlet and outlet for a given throughput of the fan will differ from those pertaining in the arrangement of FIG. 1 because the flow resistance of the filter 16 is now downstream instead of upstream of the fan, (they will both be higher). However, the pressure differential across the fan in this arrangement will be similar to that of FIG. 1 and this differential will be affected by the respiration of the wearer in a similar fashion. The function of the sensor 17 in controlling the motor 13 in response to the breathing demand of the wearer and in providing an equilibrium low-flow condition in the FIG. 4 arrangement is therefore equivalent to that of FIG. 1 and detailed description in this respect will accordingly not be repeated. Furthermore, since the pressure at the fan inlet 15 in the FIG. 4 arrangement will differ only slightly from atmospheric pressure throughout the breathing cycle, in a modified embodiment satisfactory operation could be achieved with the chamber 21 of the sensor 17 simply opening to atmosphere.

It will be appreciated that in FIG. 4 the diaphragm 20 of the sensor 17 will itself be exposed to contaminated air. Any contaminant which may pass through the sensor by diffusion through, or other defective sealing of, the diaphragm 20 will however be removed in the filter 16 together with the contaminant in the main flow of air passing through the apparatus. The connection of the sensor in this arrangement therefore provides no pathway for unfiltered air to reach the facepiece 1 irrespective of the condition of the diaphragm. In the unlikely event of the diaphragm actually being destroyed, it will leave the light beam from emitter 28 to receiver 29 unrestricted so that the motor 13 will then run continuously at full power.

I claim:

1. A breathing apparatus comprising: a motor-driven fan; filter means connected to the fan for removing one or more unwanted components from air drawn into the apparatus from the external atmosphere by operation of the fan; a breathing interface means connected to receive such filtered air; a differential pressure sensor comprising a flexible pressure-responsive member so connected to the apparatus as to be exposed on its opposite sides respectively to the pressure within the apparatus downstream of at least a stage of said fan and the pressure within the apparatus upstream of at least said stage of said fan or atmospheric pressure, and whereby in the event of destruction of or permeability of said pressure-responsive member to a said unwanted component the connection of the pressure sensor provides no pathway from the external atmosphere to said breathing interface means which does not also include said filter means; and control means for controlling the operation of the fan motor in response to said sensor whereby to reduce the throughput of the fan in response to an increase in the pressure differential sensed by the sensor and to increase the throughput of the fan in response to a decrease in said pressure differential.

2. An apparatus according to claim 1 wherein the filter means are connected upstream of the fan and the pressure-responsive member is connected so as to be exposed on its opposite sides respectively to the pressure within the apparatus downstream of at least said stage of the fan and the pressure within the apparatus downstream of the filter means but upstream of at least said stage of the fan.

3. An apparatus according to claim 1 wherein the filter means are connected downstream of the fan and the pressure-responsive member is connected so as to be exposed on its opposite sides respectively to the pressure within the apparatus downstream of at least said stage of the fan but upstream of the filter means and the pressure within the apparatus upstream of at least said stage of the fan or atmospheric pressure.

4. An apparatus according to claim 1 wherein the pressure-responsive member is connected so as to be exposed on its opposite sides respectively to the pressure at the outlet and at the inlet of the fan.

5. An apparatus according to claim 1 wherein the pressure sensor is arranged to provide a variable output over a range of pressure differentials in response to which proportional control of the fan throughput is effected by said control means.

6. An apparatus according to claim 1 wherein the pressure sensor and control means are arranged to provide a constant fan throughput at a selected low flow rate in the absence of an imposed breathing pattern within the breathing interface means.

7. An apparatus according to claim 1 wherein said sensor comprises an emitter and a receiver of selected electromagnetic radiation mounted in relation to the pressure-responsive member such that the level of said radiation received from the emitter by the receiver is dependent upon the flexural position adopted by that member.

8. An apparatus according to claim 7 wherein said emitter and receiver face one another across a space within which the pressure-responsive member flexes whereby a beam of said radiation emitted by the emitter towards the receiver is interrupted to a variable extent by the pressure-responsive member in dependence upon the pressure differential across that member.

9. An apparatus according to claim 7 wherein said emitter and receiver comprise respectively an infra red light emitting diode and photo-transistor.

10. An apparatus according to claim 1 wherein said pressure-responsive member is in the form of a diaphragm having a disc-like central portion which is joined to a fixed peripheral portion of the diaphragm through an annular corrugated portion which provides the operative flexibility of the diaphragm, whereby in response to change in the differential pressure across the diaphragm said central portion moves relative to said peripheral portion along the axis of the diaphragm while remaining substantially perpendicular to said axis.

11. A breathing apparatus comprising: a motor-driven fan; filter means connected to the inlet of the fan for removing one or more unwanted components from air drawn into the apparatus from the external atmosphere by operation of the fan; a facepiece connected to the outlet of the fan to receive such filtered air; a differential pressure sensor comprising a flexible pressure-responsive member so connected to the apparatus as to be exposed on its opposite sides respectively to the pressure within the apparatus at the outlet of said fan and the pressure within the apparatus at the inlet of said fan, whereby in the event of destruction of or permeability of said pressure-responsive member to a said unwanted component the connection of the pressure sensor provides no pathway to the facepiece for air which has not already traversed said filter means; and control means for controlling the operation of the fan motor in response to said sensor whereby to reduce the throughput of the fan in response to an increase in the pressure differential sensed by the sensor and to increase the throughput of the fan in response to a decrease in said pressure differential.

12. A breathing apparatus comprising: a motor-driven fan; filter means connected to the outlet of the fan for removing one or more unwanted components from air drawn into the apparatus from the external atmosphere by operation of the fan; a facepiece connected to the outlet of the filter means to receive such filtered air; a differential pressure sensor comprising a flexible pressure-responsive member so connected to the apparatus as to be exposed or its opposite sides respectively to the pressure within the apparatus at the outlet of said fan and the pressure within the apparatus at the inlet of said fan, whereby in the event of destruction of or permeability of said pressure-responsive member to a said unwanted component the connection of the pressure sensor provides no pathway for air to the facepiece except one which also includes said filter means; and control means for controlling the operation of the fan motor in response to said sensor whereby to reduce the throughput of the fan in response to an increase in the pressure differential sensed by the sensor and to increase the throughput of the fan in response to a decrease in said pressure differential.

13. A breathing apparatus comprising: a motor-driven fan; filter means connected to the outlet of the fan for removing one or more unwanted components from air drawn into the apparatus from the external atmosphere by operation of the fan; a facepiece connected to the outlet of the filter means to receive such filtered air; a differential pressure sensor comprising a flexible pressure-responsive member so connected to the apparatus as to be exposed on its opposite sides respectively to the pressure within the apparatus at the outlet of said fan and atmospheric pressure, whereby in the event of destruction of or permeability of said pressure-responsive member to a said unwanted component the connection of the pressure sensor provides no pathway for air to the facepiece except one which also includes said filter means; and control means for controlling the operation of the fan motor in response to said sensor whereby to reduce the throughput of the fan in response to an increase in the pressure differential sensed by the sensor and to increase the throughput of the fan in response to a decrease in said pressure differential.

* * * * *